United States Patent [19]

Yan

[11] 4,118,281
[45] Oct. 3, 1978

[54] CONVERSION OF SOLID WASTES TO FUEL COKE AND GASOLINE/LIGHT OIL

[75] Inventor: Tsoung-Yuan Yan, Philadelphia, Pa.

[73] Assignee: Mobil Oil Corporation, New York, N.Y.

[21] Appl. No.: 788,063

[22] Filed: Apr. 15, 1977

[51] Int. Cl.$^2$ .................. C10B 57/04; C10G 1/04
[52] U.S. Cl. ...................... 201/2.5; 48/209; 201/23; 201/25; 208/8; 260/2.3
[58] Field of Search ............... 201/2.5, 25, 23; 48/111, 209; 260/683 PD, 2.3; 208/8

[56] References Cited

U.S. PATENT DOCUMENTS

| 59,004 | 10/1866 | Green | 201/23 |
|---|---|---|---|
| 1,950,811 | 3/1934 | Heidelberg et al. | 201/23 |
| 2,054,725 | 9/1936 | Greenstreet | 201/2.5 X |
| 2,412,879 | 12/1946 | Fischer | 201/23 X |
| 3,674,433 | 7/1972 | Wyatt | 260/2.3 X |
| 3,750,600 | 8/1973 | Ohsol et al. | 260/683 PD UX |
| 4,052,292 | 10/1977 | Espenscheid et al. | 201/23 X |

Primary Examiner—Morris O. Wolk
Assistant Examiner—Arnold Turk
Attorney, Agent, or Firm—Charles A. Huggett; Carl D. Farnsworth

[57] ABSTRACT

Solid organic wastes are slurried with hot coker recycle feed or fresh petroleum feedstocks at temperatures within the range from about 300° to 1000° F and the resulting mixture is coked to produce gas, oil, and coke. The oil can be used as clean liquid fuel, but preferably it is used as catalytic craker feed since it is a particularly suitable cracking stock and produces high yields of gasoline. This process affords a low-cost waste disposal method by a process compatible with current petroleum refining technology.

15 Claims, 1 Drawing Figure

CONVERSION OF SOLID WASTES TO FUEL COKE AND GASOLINE/LIGHT OIL

BACKGROUND OF THE INVENTION

1. Field of the Invention

This invention relates to the disposal of solid wastes, particularly solid organic wastes, and further relates to an economical process for the preparation of fuels from waste materials. More particularly, this invention relates to a method for thermally decomposing and carbonizing solid organic wastes.

2. Description of the Prior Art

Pyrolysis processes are known for chemically converting organic materials to other, useful chemical products. Aside from the pyrolysis of raw materials (such as coal) which have recognized value in their unconverted state, some consideration has been given more recently to chemically converting solid organic wastes. For example, see "Industrial Solid Wastes Management," pp. 356–406, the Proceedings of the National Industrial Solid Wastes Management Conference, jointly sponsored by the University of Houston and the Bureau of Solid Waste Management on Mar. 24–26, 1970. Furthermore, methods for the concurrent pyrolytic treatment of solid organic materials and mineral oils are known.

It has been proposed to pyrolytically decompose rubber and plastic wastes by feeding the wastes either directly or in the molten state to a pyrolysis reaction furnace and maintaining the wastes therein for a sufficient period of time to decompose the wastes. For example, U.S. Pat. No. 3,956,414 describes a method of converting solid, amorphous polyolefin material to a liquid oil product which comprises melting the polyolefin by heating with a petroleum hydrocarbon oil and thermally cracking the resulting melt at a temperature of about 250° to 450° C. Other variations of the pyrolytic decomposition process are described in U.S. Pat. Nos. 3,674,433; 3,823,223; 3,832,151; and 3,984,288. The chief disadvantage of this approach is the amount of time required for the process to generate useful products in that heating times in excess of three hours are often required to decompose the rubber and plastics.

U.S. Pat. No. 1,950,811 discloses a process for recovering oil and high-temperature coke from oil-bearing residues by carbonizing oil-bearing residues from the destructive hydrogenation of coal and mineral oils in conjunction with natural carbonizable solid materials such as coal, peat, sawdust, and the like. More specifically, a high-temperature coke is produced at temperatures within the range from about 900° to 1000° C. (1650° to 1830° F.). To be contrasted with the process of U.S. Pat. No. 1,950,811 is the process disclosed in U.S. Pat. No. 2,054,725 which comprises "distilling" at relatively low temperatures—temperatures not exceeding about 380° to 400° C. (715° to 755° F.)—a mixture of about equal parts by weight of oil and a finely divided solid carbonaceous material containing volatile hydrocarbons.

U.S. Pat. No. 2,412,879 describes a process for continuously coking heavy petroleum residual oils in a moving bed coking zone to produce vaporizable hydrocarbons and a soft, highly frangible coke which may be continuously removed from the coking zone. According to the U.S. Pat. No. 2,412,879 process, the coker feed oil is slurried with from 1 to 10 percent by weight of a cellulosic material such as sawdust and heated to a temperature of from about 800° F. to 1100° F. before being charged to the coking zone. The sawdust forms an adsorbent charcoal during heating which, when intermixed with the formed petroleum coke, renders the coke more easily removable from the coking drum. Thus, the U.S. Pat. No. 2,412,879 process may be characterized as producing a petroleum coke having a relatively small amount of cellulosic-derived char associated therewith. A similar "additive-type" process is disclosed in U.S. Pat. No. 1,864,687.

U.S. Pat. No. 3,909,364 discloses and claims a method for treating carbonizable waste selected from the class consisting of garbage and sanitary sludge cake wherein the carbonizable waste is dried and commingled with coal, the commingled mix is devolatized to produce a devolatilized char, the char is partially combusted to produce heated char, and the heated char is mixed with residual oil and coked in a fluidized bed to produce a solid fuel product and fluid by-products. The U.S. Pat. No. 3,909,364 method requires extensive equipment: dryers, devolatilizers, heat generators, and fluid cokers. Moreover, the process is further complicated by the need for conveying solids between the various processing zones.

Given the proliferation of used rubber tires, plastic and paper packaging materials, one-way plastic and paper containers, by-product and substandard polymers, and solid organic wastes generally, improved methods of recovering the hydrocarbon values contained therein are needed, particularly in view of the increasing scarcity of oil and natural gas. The potentially valuable hydrocarbons in such materials would be better utilized if an economically attractive method could be devised for transforming them into useful liquid, solid, and/or gaseous hydrocarbon products having utility as fuel or as petrochemical raw materials.

SUMMARY OF THE INVENTION

Solid organic wastes such as municipal garbage, plastics, papers, wood, rubber, etc., are slurried in coker feed or other selected petroleum-derived streams and heated at a temperature within the range from about 300° to 1000° F. for a period of time sufficient to partially or completely dissolve and decompose the organic wastes in the coker feed. Thermal decomposition in the liquid phase produces oil, carbon residue, water, and gases. The full mixture is then fed to a coker, either delayed or fluid, and the thermal reaction continues to complete the coking process. The solid organic waste components of the mixture contribute to the yield of gas, oil, and coke from the coker. The oil can be used as clean liquid fuel, but preferably it is used as catalytic cracker feed to produce high yields of gasoline. The solid organic wastes should be free of, or low in, inorganic contaminants such as glass and metals so that the ash content of the product coke will not be substantially increased.

To facilitate dissolution of the organic waste in the coker feed, thermally-stable refinery petroleum fractions such as catalytic cracker recycle feed, FCC main column bottoms, and TCC syntower bottoms can be used to dissolve the organic waste, and the resulting mixture is then fed to the coker with the rest of the coker feed. The catalytic cracker recycle feed and bottoms are essentially inert in the coker, and are recycled to the catalytic crackers upon function as the solvent.

The liquid phase pyrolysis of organic waste as described herein produces more oil than gas phase destructive distillation or pyrolysis or organic waste. Moreover, dissolution of solid organic wastes in refinery petroleum streams alleviates handling problems encountered in known pyrolytic disposal methods and allows integration of the solid waste disposal method with current petroleum refining processes.

DETAILED DESCRIPTION OF THE INVENTION

Figure 1:
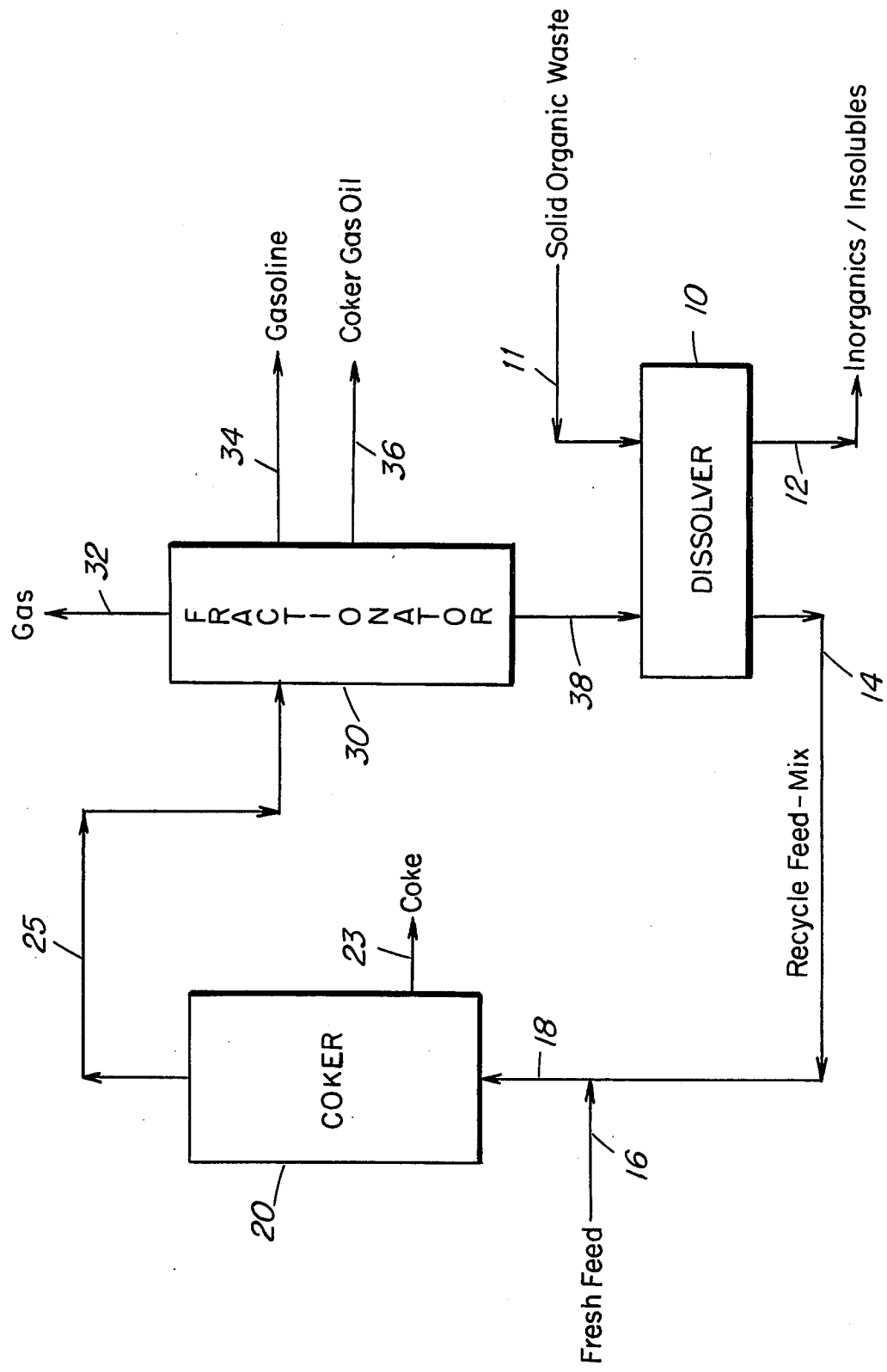
FIG. 1 is a schematic flow diagram of a solid waste disposal method within the scope of this invention.

The term "waste" refers to anything that anybody discards and the term "solid organic waste" refers to any organic waste in solid or semi-solid form. "Garbage" is food waste. "Rubbish" is solid waste minus garbage. "Scrap" is any sort of fragment or leftover-scrap material is generally included within the scope of the term "waste" as it is used herein.

The present invention is a method of disposing of solid organic wastes. "Disposal" includes both stowing away wastes somewhere and converting them to something else. Thus, the present process is more specifically described as a disposal method of the latter type; it is a method of disposing of solid organic wastes by converting them to something else. The solid organic wastes which are converted by the disposal process of this invention generally include municipal garbage and certain refuse and agricultural wastes and more specifically include rubbers and plastics, paper, and wood.

Municipal solid organic waste materials include garbage, rubbish, and sewage sludge. The composition of municipal waste consists substantially of carbohydrate products such as cardboard, newsprint and other forms of paper. Excluding moisture, metals and siliceous materials, the carbohydrate content of municipal refuse is usually above 90 percent. Table I illustrates the content of a typical municipal waste composition. The Table I data is by Kaiser, E. R., "Refuse Reduction Process" reported in "Proceedings, the Surgeon General's Conference on Solid Waste Management for Metropolitan Washington," U.S. Public Health Service Publication No. 1729, Government Printing Office, Washington, D.C., July 1967, p. 93.

Table I

| East Coast Municipal Waste Composition | | | |
|---|---|---|---|
| Cardboard | 7% | Moisture | 28.0% |
| Newspaper | 14% | Carbon | 25.0% |
| Miscellaneous Paper | 25% | Hydrogen | 3.3% |
| Plastic Film | 2% | Oxygen | 21.1% |
| Leather, molded | | Nitrogen | 0.5% |
| plastics, rubber | 2% | Sulfur | 0.1% |
| Garbage | 12% | Glass, ceramics | |
| Grass and dirt | 10% | stone | 9.3% |
| Textiles | 3% | Metals | 7.2% |
| Wood | 7% | Ash, other inerts | 5.5% |
| Glass, ceramics, stone | 10% | | |
| Metallics | 8% | | |
| Total | 100% | Total | 100.0% |

Solid organic agricultural wastes are derived in the form of wheat straw, rice straw, rye straw, maize husks and stalks, sugar cane bagasse, and other cellulosic agricultural byproducts.

Plastics disposed of by the present invention fall into various categories. Generally, the plastics employed are dictated by their commercial importance. For instance, it has been found that a typical plastics waste for disposal comprises on the average approximately 50 percent polyvinyl chloride, approximately 30 percent polystyrene, and the remaining approximately 20 percent various other plastics such as polyethylene, polypropylene, polyesters, polyacrylics, and the like. Thus, for the most part waste plastics fall into three important categories: poly(halogenated hydrocarbons), poly(straight-chain olefins), and poly(vinyl aromatics). The representative and most commercially important members of these three categories are polyvinyl chloride, polyethylene, and polystyrene, respectively.

The word "rubber" as used herein shall be understood to mean natural and synthetic rubbers and includes plantation rubber, thiokols, neoprenes, nitrile rubbers, styrene rubbers, butyl rubbers, polybutadiene, silicone rubbers, acrylate rubbers, polyurethanes, fluororubbers, etc.

The rubbers and plastics to be treated by this invention encompass a wide variety of solid polymeric materials. The properties of these materials vary widely, depending on compounding, fabrication, thermal history, and many other variables. It is apparent that not all of these materials can be dissolved in the petroleum-derived streams employed in the process of this invention. However, dissolution, while preferred is not necessary to the operability of the process—the dispersal of the rubber and plastics in the petroleum medium and the subsequent coking of the dispersion will normally produce highly desirable products. Nevertheless, certain polymeric materials are so resistant to decomposition by the process of this invention that it is desirable to avoid using them as feeds. Generally, such materials may be described as thermosetting resins, i.e., resins subject to crosslinking reactions at temperatures necessary to induce flow so that the ability to flow is rather quickly lost in favor of form stability.

It is an advantage of the present invention process that the solid organic waste material does not require extensive pretreatment before admixture with the petroleum solvent medium. A solid urban waste or agricultural waste is subjected to a shredding and macerating procedure and then introduced directly into the invention disposal system. However, the solid waste feed should be free of inorganic waste materials such as siliceous wastes (e.g., glass and ceramics) and metals. If the waste material feed is soluble in the petroleum oil, the inorganic, insoluble components in the petroleum oil/waste composite can be separated by filtration, centrifugation, sedimentation, or other known solids-liquid separation techniques after dissolution of the solid organic wastes. Moreover, metals separation may be conveniently effected by subjecting the comminuted solid organic waste to a magnetic separation step prior to slurrying the waste with coker feed or other selected refinery petroleum fractions.

If more elaborate pretreatment of the solid waste feed is advantageous, a gross separation of combustible and noncombustible materials can be effected by methods and equipment known in the art. Suitable solid waste pretreatment systems are described in U.S. Pat. No. 3,714,038 and U.S. Pat. No. 3,933,577. In a typical system, solid waste is admixed with water and subjected to a pulping action. The effluent slurry is then passed through liquid cyclone and course screen zones to remove glass, stone, and metal material and the like. The pulp slurry is dewatered prior to processing according to the present invention.

Coker petroleum feedstocks are high-boiling hydrocarbons, particularly residues obtained from cracking or distillation of asphaltenic crude distillates. They usually have an initial boiling point of about 700° F. or higher, an API gravity of about 0° to 20°, and a Conradson carbon residue content of about 5 to 40 weight percent. Coking is known to be particularly advantageous when applied to refractory, aromatic feedstocks such as slurry decanted oils from catalytic cracking and tars from thermal cracking.

Delayed coking is a process to increase yields of gas oil and gasoline which employs a heating means, a coking chamber designed to accumulate substantial quantities of coke between cleanings, and a fractionator which recovers valuable consituents from the volatiles driven off from the coking chamber. In a typical delayed coker, preheated coker feedstock is combined with heavy residue passing from the bottom of the fractionator and this mixture is heated in a tube still heater or furnace to a temperature of about 900° F. (generally within the range from 800° to 1100° F.). The heated mixture then passes to a coking drum where the residence time is sufficient for coke to form and settle from the mixture. The vapors from the coking drum are returned to the fractionator where gas, gasoline, and gas oil are separated and leave the unit. The heavier (850° F.+) materials appear in the bottom of the fractionator and are recycled to the coking operation. When coke builds up to a predetermined level in one of the coking drums, flow is diverted to another drum so that the operation is semi-continuous. Thus, drums are operated in pairs with one on-stream while the other is being decoked.

In the fluid coking process, small particles of coke formed in the process itself circulate in a fluidized state between a coking reactor and a burner, acting as a heat transfer medium. Steam is used to fluidize the coke bed in the reactor. Generally, fluid coking of petroleum fractions requires no preheat furnace nor does it require elaborate mechanical equipment for handling the product coke.

Disposal of solid organic waste is accomplished according to the present invention by first slurrying the waste in coker feed—either fresh petroleum-derived feed or recycle feed or a combination thereof and heating the slurry at a temperature within the range from about 300° to 900° F. for a period of time sufficient to at least partially dissolve the solid waste. Preferably, the slurry is heated at a temperature within the range from about 500° to 700° F. Employment of a closed system under moderate or high pressures is not necessary. Nor is it necessary to contact the slurry with a reducing gas such as hydrogen or synthesis gas. Slurrying and heating can be conducted in an open reactor system at atmospheric pressure and without the use of catalysts or promoters.

The slurry is heated for a reaction time sufficient to yield a heavy oil or pitch-like composition. The heating step of the invention process is conducted for a period of time between 0.2 and 3 hours, and preferably for a period of time between about 0.5 and 1.5 hours. Although it is not essential, the liquefaction reaction can be conducted under pressure and/or in the presence of a reducing gas (e.g., under a hydrogen or carbon monoxide pressure of about 100–2000 psi).

The solid waste component in the waste slurry is provided in a quantity below about 10 parts by weight per part by weight of the solvent component. Normally, the preferred ratio will be in the range between about 0.1 and 5.0 parts by weight of solid waste per part by weight of solvent.

The heavy oil or pitch-like composition is then charged to a coker to complete the thermal decomposition of the solid organic wastes. The coker is maintained at temperatures within the range from about 800° to 1000° F. If a delayed coker is employed, the coking temperature is maintained within the range from about 800° to 950° F. If a fluid coker is employed, the coking temperature is maintained within the range from about 850° to 1000° F. Depending upon the temperatures of the slurrying step and the subsequent coking step, it may be necessary to preheat the modified coker feed to coking temperature before charging it to the coker.

Especially preferred solid organic waste solvents are "thermally stable" refinery petroleum fractions. When such solvents are employed, the solid waste is slurried and heated as described above and the resulting mixture is added to the coker together with conventional coker feeds.

By the term "thermally stable" refinery petroleum fractions is meant a highly aromatic residuum such as fluidized catalytic converter (FCC) "main column" bottoms or thermofor catalytic converter (TCC) "syntower" bottoms which contain a substantial proportion of polycyclic aromatic hydrocarbon constituents such as naphthalene, dimethylnaphthalene, anthracene, phenanthrene, fluorene, chrysene, pyrene, perylene, diphenyl, benzothiophene, and the like. Such refractory petroleum media are resistant to conversion to lower molecular products by conventional non-hydrogenative procedures. Typically, these petroleum refinery residua and recycle fractions are hydrocarbonaceous mixtures having an average carbon to hydrogen ratio above about 1:1, and a boiling point above about 450° F.

The petroleum solvents especially suitable for the practice of the present invention process are thermally stable, highly polycyclic aromatic mixtures which result from one or more petroleum refining operations. Representative heavy petroleum solvents include FCC main tower bottoms; TCC syntower bottoms; asphaltic material; alkane-deasphalted tar; coker gas oil; heavy cycle oil; FCC main tower clarified slurry oil; mixtures thereof, and the like.

The nominal properties of suitable petroleum solvents are as follows:

| Syntower Bottoms | |
|---|---|
| Sulfur | 1.13% |
| Nitrogen | 450 ppm |
| Pour Point | 50° F |
| Initial Boiling Point | 489° F |
| 95% Point | 905° F |
| Conradson Carbon | 9.96 |
| FCC Clarified Slurry Oil | |
| Sulfur | 1.04% |
| Nitrogen | 4400 ppm |
| Pour Point | 50° F |
| Initial Boiling Point | 470° F |
| 95% Point | 924° F |
| Conradson Carbon | 10.15 |
| Heavy Cycle Oil | |
| Sulfur | 1.12% |
| Nitrogen | 420 ppm |
| Initial Boiling Point | 373° F |
| 95% Point | 752° F |
| Conradson Carbon | 10.15 |

An FCC main column bottoms refinery fraction is a highly preferred solvent for the practice of the present invention process. A typical FCC main column bottoms (or FCC clarified slurry oil) contains a mixture of chemical constituents as represented in the following mass spectrometric analysis:

| Compounds | Aromatics | Naphthenic/ Aromatics | Labile H$_2$ % |
|---|---|---|---|
| Alkyl-Benzene | 0.4 | | 0 |
| Naphthene-Benzenes | | 1.0 | 0.03 |
| Dinaphthene-Benzenes | | 3.7 | 0.16 |
| Naphthalenes | 0.1 | | 0 |
| Acenaphthenes, (biphenyls) | | 7.4 | 0.08 |
| Fluorenes | | 10.1 | 0.11 |
| Phenanthrenes | 13.1 | | |
| Naphthene-phenanthrenes | | 11.0 | 0.18 |
| Pyrenes, fluoranthenes | 20.5 | | 0 |
| Chrysenes | 10.4 | | 0 |
| Benzofluoranthenes | 6.9 | | 0 |
| Perylenes | 5.2 | | 0 |
| Benzothiophenes | 2.4 | | |
| Dibenzothiophenes | 5.4 | | |
| Naphthobenzothiophenes | | 2.4 | 0.04 |
| Total | 64.4 | 35.6 | 0.60 |

A typical FCC main column bottoms has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |
| Pour Point, ° F: | 50 |
| CCR, %: | 9.96 |
| Distillation: | |
| IBP, ° F: | 490 |
| 5%, ° F: | 800 (est.) |
| 95%, ° F: | 905 |

FCC main tower bottoms are obtained by the catalytic cracking of gas oil in the presence of a solid porous catalyst. A more complete description of the production of this petroleum fraction is disclosed in U.S. Pat. No. 3,725,240.

A FCC main column bottoms is an excellent liquefaction solvent medium for solid organic waste solubilization because it has a unique combination of physical properties and chemical constituency. A critical aspect of solvating ability is the particular proportions of aromatic and naphthenic and paraffinic moieties characteristic of a prospective liquefaction solvent. A high content of aromatic and naphthenic structures in a solvent is a criterion for high solvating ability for solid organic waste liquefaction.

The solvating ability of a solid organic waste liquefaction solvent can be expressed in terms of specific types of hydrogen content as determined by proton nuclear magnetic resonance spectral analysis. Nuclear magnetic resonance characterization of heavy hydrocarbon oils is well developed. The spectra (60μc/sec) are divided into four bonds (H$_\alpha$, H$_\beta$, H$_\gamma$ and H$_{Ar}$) according to the following frequencies in Hertz (Hz) and chemical shift (δ):

| | H$_\alpha$ | H$_\beta$ | H$_\gamma$ | H$_{Ar}$ |
|---|---|---|---|---|
| Hz | 0–60 | 60–100 | 120–200 | 360–560 |
| δ | 0–1.0 | 1.0–1.8 | 2.0–3.3 | 6.0–9.2 |

The H$_{Ar}$ protons are attached to aromatic rings and are a measure of aromaticity of a solvent. H$_\alpha$ protons are attached to non-aromatic carbon atoms attached directly to an aromatic ring structure, e.g., alkyl groups and naphthenic ring structures. H$_\beta$ protons are attached to carbon atoms which are in a second position away from an aromatic ring, and H$_\gamma$ protons are attached to carbon atoms which are in a third position or more away from an aromatic ring structure.

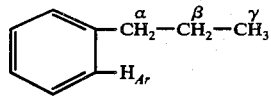

The H$_{Ar}$ protons are important because of their strong solvency power. A high content of H$_\alpha$ protons is particularly significant in a liquefaction solvent, because H$_\alpha$ protons are labile and are potential hydrogen donors in a solid organic waste liquefaction process. H$_\beta$ and H$_\gamma$ protons are paraffinic in nature and do not contribute to the solvating ability of a liquefaction solvent.

It is particularly preferred that the FCC main column bottoms employed as a solid organic waste liquefaction solvent in the present invention process have a hydrogen content distribution in which the H$_{Ar}$ proton content is between about 30 and 50 percent, the H$_\alpha$ proton content is at least about 30 percent and the H$_\alpha$/H$_\beta$ proton ratio is above about 1.4. Concomitantly it is desirable that the H$_\beta$ proton content is below 20 percent and the H$_\gamma$ proton content is below 13 percent.

Referring now to FIG. 1, solid organic wastes introduced through line 1 are slurried with 850° F.+ coker recycle oil from line 38 in dissolver 10 and heated at a temperature within the range from about 500° to 700° F. for a period of time sufficient to dissolve at least a portion of the solid wastes and to form a pitch-like composition. If the solid organic waste is soluble in the coker recycle oil (e.g., rubber and plastic wastes), inorganic and insoluble material may be separated from the pitch-like composition by means such as sedimentation, filtration, centrifugation, and the like and removed via line 12. The recycle feed mix passes from dissolver 10 through line 14 and is admixed with fresh petroleum-derived coker feed introduced via line 16. The total coker feed then passes through line 18 to coker 20 wherein the feed is heated in the presence of steam to temperatures within the range from about 800° to 1000° F. and coked in a conventional way (e.g., fluid or delayed coking). Product coke is withdrawn via line 23. Coker volatiles pass from coker 20 through line 25 to fractionator 30 wherein a gas fraction is recovered via line 32, a C$_4$—450° F. gasoline fraction is recovered via line 34, a 450°–850° F. coker gas oil fraction is recovered via line 36, and an 850° F.+ recycle oil is recovered via line 38.

The quality of coker gas oil (line 36) derived from the organic wastes depends on the nature of the organic waste itself. Rubber and plastic wastes in particular produce coker gas oils which are excellent catalytic cracker feed. The cracker can be operated in a conventional way.

What is claimed is:
1. A conversion process for the disposal of solid organic wastes which comprises:
 a. slurrying solid organic wastes in coker feed selected from the group consisting of coker petroleum feed stocks, coker recycle feed, and combinations thereof, wherein the weight ratio of solid organic waste to coker feed is within the range from 0.1 to 0.5;

b. heating the slurry at a temperature within the range from about 300° to 1000° F. for a period of time sufficient to convert the slurry into a pitch-like composition;

c. coking the pitch-like composition at a temperature within the range from about 800° to 1000° F.; and d. recovering gas, oil, and coke products.

2. The process of claim 1 wherein the solid organic waste is selected from the group consisting of rubber and plastic wastes.

3. The process of claim 1 wherein the solid organic wastes are slurried in a thermally stable refinery petroleum fraction boiling above about 450° F.

4. The process of claim 1 wherein said slurry is heated at a temperature within the range from about 500° to 700° F.

5. The process of claim 1 wherein at least a portion of the oil product is converted in a catalytic cracker to produce hydrocarbons boiling in the gasoline range.

6. The process of claim 1 wherein the solid organic waste is municipal solid organic waste selected from the group consisting of garbage and sewage sludge.

7. The process of claim 1 wherein the solid organic waste is selected from the group consisting of municipal and agricultural solid organic wastes and mixtures thereof.

8. The process of claim 7 wherein the municipal solid organic waste is selected from the group consisting of garbage and sewage sludge.

9. The process of claim 7 wherein the agricultural solid organic waste is a cellulosic agricultural by-product.

10. A conversion process for the disposal of solid organic wastes which comprises:

a. slurrying solid organic waste in a thermally stable refinery petroleum fraction boiling above about 450° F., wherein the weight ratio of solid organic waste to thermally stable refinery petroleum fraction is within the range from about 0.1 to 0.5;

b. heating the slurry at a temperature within the range from about 500° to 700° F. for a period of time sufficient to convert the slurry into a pitch-like composition;

c. combining the pitch-like composition with a coker petroleum feedstock and coker recycle feed to form a modified coker feed;

d. coking the modified coker feed at a temperature within the range from about 800° to 1000° F. to form a product coke and coker volatiles;

e. fractionating the coker volatiles to recover a $C_1$-$C_3$ gas fraction, a $C_4$- 450° F. gasoline fraction, a 450°-850° F. coker gas oil fraction; and an 850° F.+ recycle oil.

11. The process of claim 10 wherein the thermally stable refinery petroleum fraction is TCC syntower bottoms.

12. The process of claim 10 wherein the solid organic waste is municipal solid organic waste selected from the group consisting of garbage and sewage sludge.

13. The process of claim 10 wherein the thermally stable refinery petroleum fraction is FCC main column bottoms.

14. The process of claim 13 wherein the solid organic waste is selected from the group consisting of rubber and plastic wastes.

15. The process of claim 14 wherein at least a portion of the 450°-850° F. coker gas oil is converted in a catalytic cracker to produce hydrocarbons boiling in the gasoline range.

* * * * *